(12) United States Patent
Schustjew

(10) Patent No.: US 12,151,599 B2
(45) Date of Patent: Nov. 26, 2024

(54) VEHICLE SEAT

(71) Applicant: GRAMMER Aktiengesellschaft, Ursensollen (DE)

(72) Inventor: Sergej Schustjew, Sulzbach-Rosenberg (DE)

(73) Assignee: GRAMMER Aktiengesellschaft, Ursensollen (DE)

( * ) Notice: Subject to any disclaimer, the term of this patent is extended or adjusted under 35 U.S.C. 154(b) by 26 days.

(21) Appl. No.: 17/996,731

(22) PCT Filed: Apr. 16, 2021

(86) PCT No.: PCT/EP2021/059949
§ 371 (c)(1),
(2) Date: Oct. 20, 2022

(87) PCT Pub. No.: WO2021/213925
PCT Pub. Date: Oct. 28, 2021

(65) Prior Publication Data
US 2024/0051442 A1    Feb. 15, 2024

(30) Foreign Application Priority Data

Apr. 21, 2020    (DE) ..................... 10 2020 110 757.9

(51) Int. Cl.
*B60N 2/50*    (2006.01)
*B60N 2/16*    (2006.01)
*B60N 2/52*    (2006.01)

(52) U.S. Cl.
CPC ............. *B60N 2/502* (2013.01); *B60N 2/162* (2013.01); *B60N 2/1665* (2013.01); *B60N 2/505* (2013.01); *B60N 2/522* (2013.01)

(58) Field of Classification Search
CPC ...... B60N 2/502; B60N 2/162; B60N 2/1665; B60N 2/505; B60N 2/522
See application file for complete search history.

(56) References Cited

U.S. PATENT DOCUMENTS 3,144,270 A * 8/1964 Bilancia ................. B60N 2/548
297/DIG. 8
3,888,451 A * 6/1975 Lacey .................... B60N 2/502
248/575

(Continued)

FOREIGN PATENT DOCUMENTS

CA          2543704        10/2007
DE      102007056700        3/2012

(Continued)

OTHER PUBLICATIONS

Official Action (with English translation) for China Patent Application No. 202180030122.3, dated Nov. 30, 2023, 9 pages.

(Continued)

*Primary Examiner* — Eret C McNichols
(74) *Attorney, Agent, or Firm* — Sheridan Ross P.C.

(57) ABSTRACT

The invention relates to a vehicle seat with a vehicle seat upper part and a vehicle seat lower part, the vehicle seat upper part and the vehicle seat lower part being connected to one another by means of a connecting means in such a way that the vehicle seat upper part can be moved relative to the vehicle seat lower part and, when the vehicle seat upper part moves relative to the vehicle seat lower part, the relative movement can be sprung by means of a spring element, the vehicle seat having an additional volume, the spring element being arranged between the vehicle seat upper part or the vehicle seat lower part and a proportion of the additional volume.

14 Claims, 8 Drawing Sheets

(56) References Cited

U.S. PATENT DOCUMENTS

| | | | | |
|---|---|---|---|---|
| 3,917,209 A * | 11/1975 | Adams | B60N 2/544 | 248/575 |
| 4,461,444 A * | 7/1984 | Grassl | B60N 2/508 | 297/344.17 |
| 4,471,934 A * | 9/1984 | Meiller | B60N 2/505 | 248/575 |
| 4,638,982 A * | 1/1987 | Misher | B60N 2/502 | 248/550 |
| 4,640,488 A * | 2/1987 | Sakamoto | B60N 2/505 | 248/564 |
| 4,685,731 A * | 8/1987 | Migut | B60N 2/164 | 248/404 |
| 4,941,641 A * | 7/1990 | Granzow | B60N 2/508 | 248/161 |
| 5,169,112 A * | 12/1992 | Boyles | B60N 2/508 | 248/421 |
| 5,176,355 A * | 1/1993 | Carter | B60N 2/502 | 248/564 |
| 5,251,864 A * | 10/1993 | Itou | B60N 2/508 | 248/588 |
| 5,364,060 A * | 11/1994 | Donovan | B60N 2/502 | 248/584 |
| 5,570,866 A * | 11/1996 | Stephens | B60N 2/527 | 267/117 |
| RE35,572 E * | 7/1997 | Lloyd | B60N 2/522 | 248/550 |
| 5,642,916 A * | 7/1997 | Dybro | B60N 2/502 | 296/68.1 |
| 5,652,704 A * | 7/1997 | Catanzarite | B60N 2/501 | 248/550 |
| 5,799,922 A * | 9/1998 | Timms | B60N 2/502 | 248/564 |
| 5,957,426 A * | 9/1999 | Brodersen | B60N 2/505 | 248/564 |
| 5,975,508 A * | 11/1999 | Beard | B60N 2/502 | 296/190.07 |
| 6,082,715 A * | 7/2000 | Vandermolen | B60N 2/525 | 267/136 |
| 6,120,082 A * | 9/2000 | Vandermolen | B60N 2/508 | 296/68.1 |
| 6,264,163 B1 * | 7/2001 | Ivarsson | B60N 2/501 | 267/64.19 |
| 6,371,456 B1 * | 4/2002 | Ritchie | F16F 15/02 | 248/550 |
| 6,705,238 B1 * | 3/2004 | Heckert | B66F 7/065 | 248/421 |
| 6,948,707 B2 * | 9/2005 | Gradu | B60G 21/0556 | 267/191 |
| 7,152,839 B2 * | 12/2006 | Mullinix | B60N 2/544 | 248/575 |
| 7,568,675 B2 * | 8/2009 | Catton | B60N 2/508 | 296/65.02 |
| 7,637,360 B2 * | 12/2009 | Carlson | B60G 17/0157 | 188/267.2 |
| 7,694,946 B2 * | 4/2010 | Shoemaker | B60N 2/505 | 248/550 |
| 7,712,836 B2 * | 5/2010 | Deml | B60N 2/501 | 297/344.16 |
| 7,770,974 B2 * | 8/2010 | Ott | B60N 2/505 | 297/344.15 |
| 7,810,884 B2 * | 10/2010 | Lorey | B60N 2/508 | 297/344.16 |
| 7,975,813 B2 * | 7/2011 | Spangler | B60N 2/38 | 188/267 |
| 8,118,287 B2 * | 2/2012 | Schordine | B60N 2/525 | 248/588 |
| 8,197,004 B2 * | 6/2012 | Wahls | B60N 2/502 | 297/344.17 |
| 8,342,541 B2 * | 1/2013 | Wurmthaler | B60N 2/508 | 280/124.157 |
| 8,366,195 B2 * | 2/2013 | Haller | B60N 2/505 | 296/65.01 |
| 8,424,832 B2 * | 4/2013 | Robbins | A47C 31/126 | 296/65.01 |
| 8,585,004 B1 * | 11/2013 | Roeglin | F16M 11/38 | 296/68.1 |
| 8,744,694 B2 * | 6/2014 | Ystueta | B60N 2/0244 | 180/271 |
| 8,931,750 B2 * | 1/2015 | Kohl | B60N 2/502 | 248/595 |
| 9,266,453 B2 * | 2/2016 | Haller | F16F 9/065 | |
| 9,291,300 B2 * | 3/2016 | Parker | B60N 2/506 | |
| 9,707,874 B2 * | 7/2017 | Bauman | B60N 2/507 | |
| 2001/0035600 A1 * | 11/2001 | St. Clair | B60N 2/501 | 267/136 |
| 2003/0075401 A1 * | 4/2003 | Carlson | F16F 7/082 | 188/267 |
| 2004/0090100 A1 * | 5/2004 | Igarashi | B60N 2/505 | 297/344.15 |
| 2004/0159763 A1 * | 8/2004 | Mullinix | B60N 2/508 | 248/421 |
| 2005/0110243 A1 * | 5/2005 | Meier | B60N 2/002 | 280/727 |
| 2005/0156093 A1 * | 7/2005 | Mullinix | B60N 2/505 | 248/421 |
| 2006/0095180 A1 * | 5/2006 | Ummethala | B60N 2/501 | 701/37 |
| 2006/0200287 A1 * | 9/2006 | Parison | B60N 2/501 | 701/1 |
| 2006/0237885 A1 * | 10/2006 | Paillard | F16F 15/0232 | 296/65.02 |
| 2007/0278057 A1 * | 12/2007 | Wereley | B60N 2/4242 | 188/267.1 |
| 2007/0278377 A1 * | 12/2007 | Moorhouse | B60N 2/508 | 248/618 |
| 2007/0278723 A1 * | 12/2007 | Shoemaker | B60N 2/525 | 267/131 |
| 2007/0284927 A1 * | 12/2007 | Therer | B60N 2/501 | 297/344.12 |
| 2008/0015753 A1 * | 1/2008 | Wereley | B60N 2/522 | 297/303.4 |
| 2008/0042480 A1 * | 2/2008 | Volkman | E02F 9/2267 | 297/344.21 |
| 2008/0156602 A1 * | 7/2008 | Hiemenz | F16F 9/53 | 188/267.1 |
| 2008/0197684 A1 * | 8/2008 | Ott | B60N 2/508 | 297/344.16 |
| 2009/0134595 A1 * | 5/2009 | Haller | B60G 17/0416 | 280/124.157 |
| 2010/0102493 A1 * | 4/2010 | Deml | B60N 2/544 | 267/140.11 |
| 2010/0122881 A1 * | 5/2010 | Carlson | F16F 15/03 | 188/267 |
| 2010/0133413 A1 * | 6/2010 | Wahls | B60N 2/525 | 297/344.1 |
| 2010/0224343 A1 * | 9/2010 | Fukuma | B65G 49/061 | 165/67 |
| 2010/0332079 A1 * | 12/2010 | Wang | B60N 2/42736 | 701/37 |
| 2011/0001342 A1 * | 1/2011 | Deml | B60N 2/502 | 297/338 |
| 2011/0024601 A1 * | 2/2011 | Shoemaker | B60N 2/508 | 248/636 |
| 2011/0024958 A1 * | 2/2011 | Deml | B60N 2/505 | 267/140.11 |
| 2012/0001467 A1 * | 1/2012 | Teufel | B60N 2/502 | 297/337 |
| 2012/0001468 A1 * | 1/2012 | Schuler | B60N 2/502 | 297/344.16 |
| 2012/0090930 A1 * | 4/2012 | Haller | B60N 2/52 | 188/280 |
| 2012/0097822 A1 * | 4/2012 | Hammarskiold | B60N 2/548 | 29/446 |
| 2012/0187615 A1 * | 7/2012 | Haller | B60N 2/525 | 267/140.13 |
| 2013/0153320 A1 * | 6/2013 | Contratto | B60N 2/502 | 297/217.3 |

(56) References Cited

U.S. PATENT DOCUMENTS

| | | | | |
|---|---|---|---|---|
| 2013/0158791 A1* | 6/2013 | Contratto | B60N 2/525 | 297/344.12 |
| 2013/0168624 A1* | 7/2013 | Shin | B60N 2/1665 | 254/93 R |
| 2013/0206949 A1* | 8/2013 | Archambault | B60N 2/508 | 248/421 |
| 2013/0264455 A1* | 10/2013 | Robbins | B60N 2/501 | 296/190.07 |
| 2015/0021965 A1* | 1/2015 | Ellerich | B60N 2/525 | 297/283.1 |
| 2015/0158404 A1* | 6/2015 | Pylypenko | B60N 2/502 | 248/575 |
| 2015/0232004 A1* | 8/2015 | Haller | B60N 2/0244 | 248/560 |
| 2015/0232005 A1* | 8/2015 | Haller | B60N 2/0244 | 248/560 |
| 2016/0200230 A1* | 7/2016 | Haller | B60N 2/502 | 296/190.08 |
| 2016/0207430 A1* | 7/2016 | Haller | B60N 2/505 | |
| 2016/0214658 A1* | 7/2016 | Haller | B60N 2/502 | |
| 2017/0051867 A1* | 2/2017 | Woodbury, II | F16F 9/535 | |
| 2018/0072189 A1* | 3/2018 | Plante | B60N 2/501 | |
| 2024/0051442 A1* | 2/2024 | Schustjew | B60N 2/502 | |

FOREIGN PATENT DOCUMENTS

| | | | | |
|---|---|---|---|---|
| DE | 102016120194 | 11/2019 | | |
| DE | 102018124512 | 4/2020 | | |
| GB | 2052961 A | * | 2/1981 | B60N 2/502 |
| GB | 2221280 | 1/1990 | | |

OTHER PUBLICATIONS

Official Action with machine translation for German Patent Application No. 102020110757.9, dated Nov. 20, 2020, 7 pages.

International Search Report and Written Opinion for International (PCT) Patent Application No. PCT/EP2021/059949, dated Jul. 20, 2021, 8 pages.

English Translation of the International Search Report for International (PCT) Patent Application No. PCT/EP2021/059949, dated Jul. 20, 2021, 2 pages.

Official Action (with English translation) for China Patent Application No. 202180030122.3, dated Apr. 18, 2024, 8 pages.

Official Action for India Patent Application No. 202227059979, dated Feb. 6, 2024, 3 pages.

Official Action for India Patent Application No. 202227059979, dated Dec. 12, 2022, 7 pages.

Official Action with English Translation for China Patent Application No. 202180030122.3, dated Jul. 19, 2024, 10 pages.

\* cited by examiner

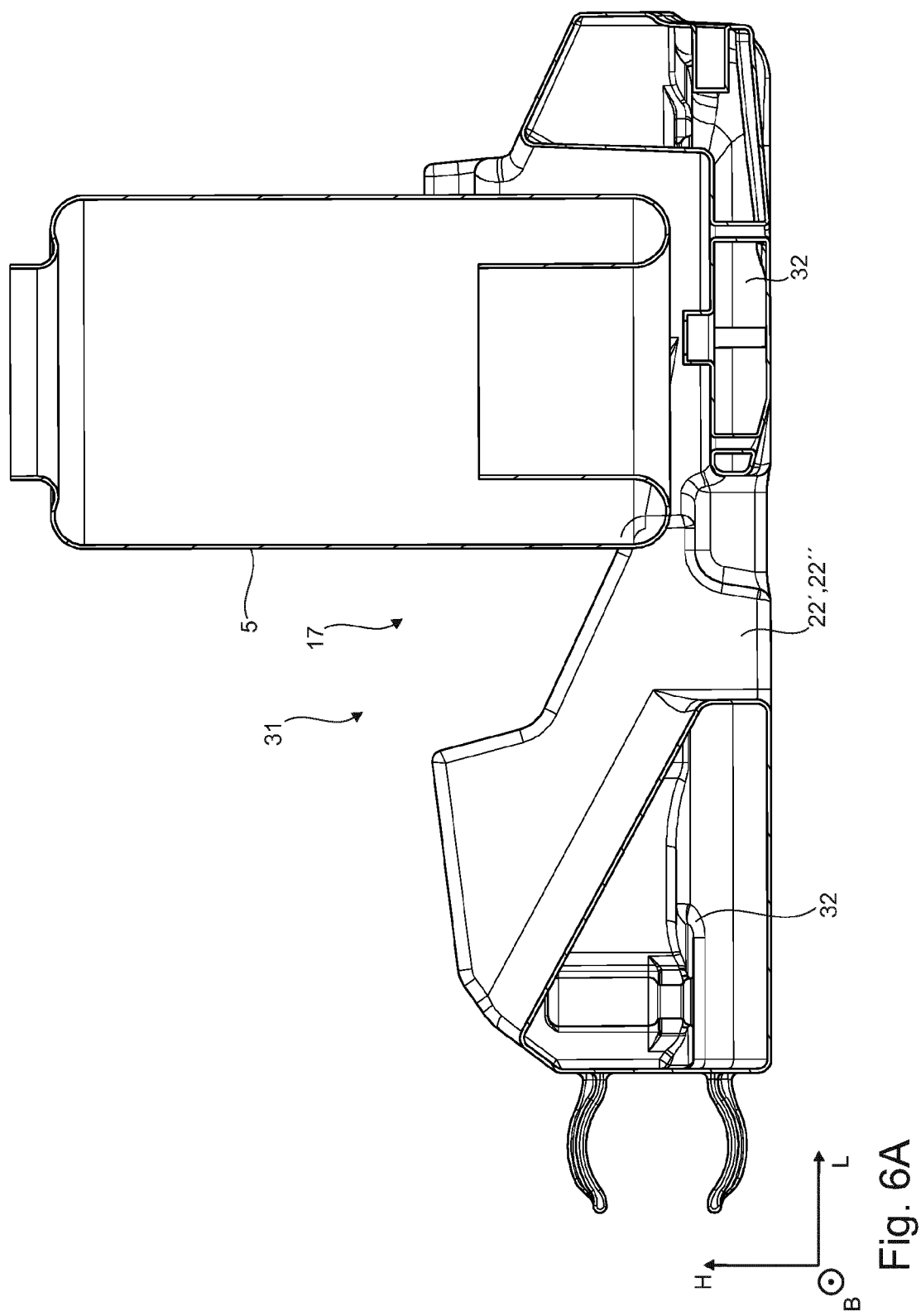

VEHICLE SEAT

CROSS REFERENCE TO RELATED APPLICATIONS

This application is a national stage application under 35 U.S.C. 371 and claims the benefit of PCT Application No. PCT/EP2021/059949 having an international filing date of 16 Apr. 2021, which designated the United States, which PCT application claimed the benefit of German Patent Application No. 10 2020 110 757.9 filed 21 Apr. 2020, the disclosures of each of which are incorporated herein by reference in their entireties.

FIELD OF THE INVENTION

Background

The invention relates to a vehicle seat having a vehicle seat upper part and a vehicle seat lower part, the vehicle seat upper part and the vehicle seat lower part being connected to one another by means of a connecting means in such a way that the vehicle seat upper part can be moved relative to the vehicle seat lower part and, in the event of a relative movement of the vehicle seat upper part with respect to the vehicle seat lower part, the relative movement can be sprung by means of a spring element.

SUMMARY

Such vehicle seats are known from the prior art, wherein the spring element is connected to an additional volume, which additional volume is arranged outside the vehicle seat for reasons of space. Often no additional volume is provided, but the spring element is connected by means of a compressor or compressor unit, by means of which the characteristics of the spring element can be changed, in particular the pressure within the air spring.

However, for reasons of space saving and operation, it is not advantageous to provide an additional volume or a compressor unit as known from the prior art.

The object of the present application to specify a vehicle seat with a spring element and an additional volume, which are arranged in such a way that a compactly constructed vehicle seat is present.

The object of the invention is solved by a vehicle seat with the features of claim 1. Advantageous embodiments of the invention can be found in the dependent patent claims.

The main idea of the invention is to specify a vehicle seat with a vehicle seat upper part and a vehicle seat lower part, wherein the vehicle seat upper part and the vehicle seat lower part are connected to one another by means of a connecting means in such a way that the vehicle seat upper part is connected to the vehicle seat lower part by means of a connecting element, in that the vehicle seat upper part can be moved relative to the vehicle seat lower part and, in the event of a relative movement of the vehicle seat upper part with respect to the vehicle seat lower part, the relative movement can be sprung by means of a spring element, the vehicle seat having a proportion of additional volume, the spring element being arranged between the vehicle seat upper part or the vehicle seat lower part and a proportion of the additional volume.

According to the invention, this means that the additional volume is no longer arranged outside a vehicle seat, but, in particular as seen in a height direction of the vehicle seat, the spring element is arranged between the vehicle seat upper part and the vehicle seat lower part and a proportion of additional volume. This means in particular that the additional volume is also arranged between the vehicle seat upper part and the vehicle seat lower part. It may be provided that the additional volume is connected either to the vehicle seat upper part or to the vehicle seat lower part. The arrangement of the spring element changes accordingly. Thus, it may be that the additional volume is connected to the vehicle seat lower part, which means accordingly that the spring element is arranged with the vehicle seat upper part and the corresponding proportion of additional volume. The same applies to the vehicle seat upper part.

This arrangement makes it possible to fill existing free spaces of the vehicle seat between the vehicle seat upper part and the vehicle seat lower part with the additional volume, so that a more compact vehicle seat can be built overall.

A connecting means is understood to be the connecting means already known from the prior art, for example a scissor frame or a parallelogram arrangement or the like.

However, according to a particularly preferred embodiment, the connecting means is a scissor frame comprising a first swing arm and a second swing arm, wherein the first swing arm and the second swing arm each comprise a first and a second swing arm part, and wherein the first swing arm and the second swing arm are rotatably connected by means of a common rotary element forming a first axis of rotation, and wherein the additional volume is arranged at least partially between the first swing arm and the second swing arm as seen in a width direction of the vehicle seat.

In particular, the first swing arm part of the first swing arm and the second swing arm part of the second swing arm are rotatably connected by the first axis of rotation. This means that the first rocker part is rotatable relative to the second rocker part. Further, the common rotary element serves to jointly guide the first swing arm and the second swing arm during a relative movement of the vehicle seat upper part to the vehicle seat lower part.

Further preferably, the spring element is also arranged between the first swing arm and the second swing arm when viewed in the width direction.

Overall, the embodiment of a scissor frame is advantageous, as shear forces occurring on the spring element during a movement of the vehicle seat lower part relative to the vehicle seat upper part can be reduced. If the connecting means were a parallelogram arrangement, the shear forces on the spring element would be significantly higher. Particularly preferably, the additional volume is arranged completely between the first swing arm and the second swing arm as seen in the width direction.

Due to the special arrangement of the additional volume in relation to the scissor frame, the available free space between the rocker arms and the vehicle seat upper part and the vehicle seat lower part can be used by the arrangement of the additional volume, so that the vehicle seat can be built compactly overall.

According to a further preferred embodiment, it may be provided that the first rocker part is rotatably connected to the vehicle seat upper part by means of a fixed bearing and to the vehicle seat lower part by means of a floating bearing, the second rocker part being rotatably connected to the vehicle seat lower part by means of a fixed bearing and to the vehicle seat upper part by means of a floating bearing. This applies, of course, to the first swing arm part of the first swing arm and to the first swing arm part of the second swing arm, and likewise to the second swing arm part.

Such a design of the scissor frame allows a good guidance of the vehicle seat upper part with respect to the vehicle seat lower part during a relative movement of the vehicle seat upper part to the vehicle seat lower part.

Of course, further designs are possible with regard to the number of floating bearings or fixed bearings.

In order to be able to prevent the common rotary element of the scissor frame from damaging the provided additional volume, it is provided according to a particular embodiment that the additional volume has a first recess extending in the width direction, so that the common rotary element can be received by the first recess during a movement of the vehicle seat upper part relative to the vehicle seat lower part. This means that the first recess is formed in such a way that the common rotary element can be guided in the first recess, in particular up to an end stop of the scissor frame or the vehicle seat. This makes it possible for the additional volume to remain undamaged by the relative movement of the vehicle seat upper part to the vehicle seat lower part.

According to a further preferred embodiment, it is provided that a first damping element is provided which is connected to the vehicle seat upper part or the vehicle seat lower part and to the connecting means, the additional volume having a second recess extending in a height direction and in a longitudinal direction of the vehicle seat, so that, in the event of a movement of the vehicle seat upper part relative to the vehicle seat lower part, the first damping element can be received by the second recess.

In particular, it is provided that the first damping element is connected to the moving parts of the connecting means, for example to the respective floating bearings of the scissor frame. Further, the first damping element is connected to either the vehicle seat upper part or the vehicle seat lower part. In case the first damping element is connected to the vehicle seat upper part, the first damping element is further connected to at least one floating bearing of the first sway bar part, said floating bearing being rotatably connected to the vehicle seat lower part. Particularly preferably, the first damping element may be connected to the floating bearing of the first swing arm part of the first swing arm and the floating bearing of the first swing arm part of the second swing arm. Further preferably, it may be provided that the floating bearing of the first swing arm part of the first swing arm is connected to the floating bearing of the first swing arm part of the second swing arm, for example by means of a connecting tube which preferably extends in the width direction of the vehicle seat.

Further, it may be provided that the second recess extends completely through the additional volume, since the first damping element is connected to the vehicle seat upper part or the vehicle seat lower part and, on the other hand, to corresponding elements of the connecting means, so that a free space must be created within the additional volume through which the first damping element can extend in order to be able to establish a connection with the corresponding component.

According to a further preferred embodiment, it is provided that one side of the additional volume is at least partially complementary to the vehicle seat upper part or the vehicle seat lower part. In particular, when the additional volume is arranged on the vehicle seat upper part, an upper side of the additional volume is formed at least partially complementary to the vehicle seat upper part. The same applies to the vehicle seat lower part, wherein a lower side of the additional volume is formed complementary to the vehicle seat lower part.

This makes it possible to achieve a good fit to the vehicle seat upper part or the vehicle seat lower part, whereby the free space between the vehicle seat upper part and the vehicle seat lower part can be further utilised and, accordingly, a volume of the additional volume can also be optimised. Further, the complementary embodiment ensures that the additional volume can be well connected to the corresponding component, thereby ensuring a secure fit to the vehicle seat upper part or the vehicle seat lower part.

It is further preferred that the additional volume is smaller in its longitudinal extension and in its width extension than the longitudinal extension and the width extension of the vehicle seat upper part and the longitudinal extension and the width extension of the vehicle seat lower part, respectively. This makes it possible to further minimise external damage.

According to a further preferred embodiment, it is provided that the spring element is fluidically connected directly to the additional volume. By such a direct connection between the spring element and the additional volume, it is thus provided that this connection is free of further connection elements, for example hose elements or the like. This can improve the response behaviour between the spring element and the additional volume, as well as further simplify the structural design and accordingly also further save installation space, whereby the vehicle seat can be built more compactly overall. Furthermore, according to a particularly preferred embodiment, it is provided that a compressor element is provided which is fluidically connected to the additional volume in order to change a pressure in the additional volume if required. By means of the compressor unit, the air volume in the entire system consisting of spring element and additional volume can be changed, whereby the pressure can also be changed accordingly. By changing the pressure or the volume, the spring characteristic of the spring element can be adjusted, whereby an adaptation to a specific driver can be made. By changing the pressure, it may also be intended to influence the seat height, i.e. the distance between the vehicle seat upper part and the vehicle seat lower part.

The compressor element is switched off in normal operation, but can be activated by the vehicle driver, i.e. the person on the vehicle seat, in order to adjust the spring characteristic curve or the seat height before, after or during operation of the vehicle seat.

According to a further preferred embodiment, it is provided that the additional volume is designed to be substantially dimensionally stable and is preferably made of a plastic.

In this context, essentially dimensionally stable is to be understood as meaning that the shape of the additional volume, which describes the volume of the additional volume, is essentially unchangeable, in particular with regard to a change in the pressure of the additional volume or of the spring element.

A dimensionally stable design of the additional volume can be achieved, for example, if the additional volume is made of a plastic which is preferably adapted to the requirements of the vehicle seat in terms of strength or toughness or breaking strength.

The dimensionally stable design of the additional volume also ensures that damage by the moving parts of the vehicle seat, for example the connecting means or the scissor frame, can be avoided.

Further advantageous embodiments result from the subclaims.

BRIEF DESCRIPTION OF THE DRAWINGS

Further aims, advantages and usefulness of the present invention can be found in the following description in connection with the drawings. Hereby show:

FIG. 6A side view of the additional volume and spring unit;

DETAILED DESCRIPTION

In the figures, identical components are to be understood with the corresponding reference signs in each case. For the sake of clarity, components may not have a reference sign in some figures but have been designated elsewhere.

Figure 1:
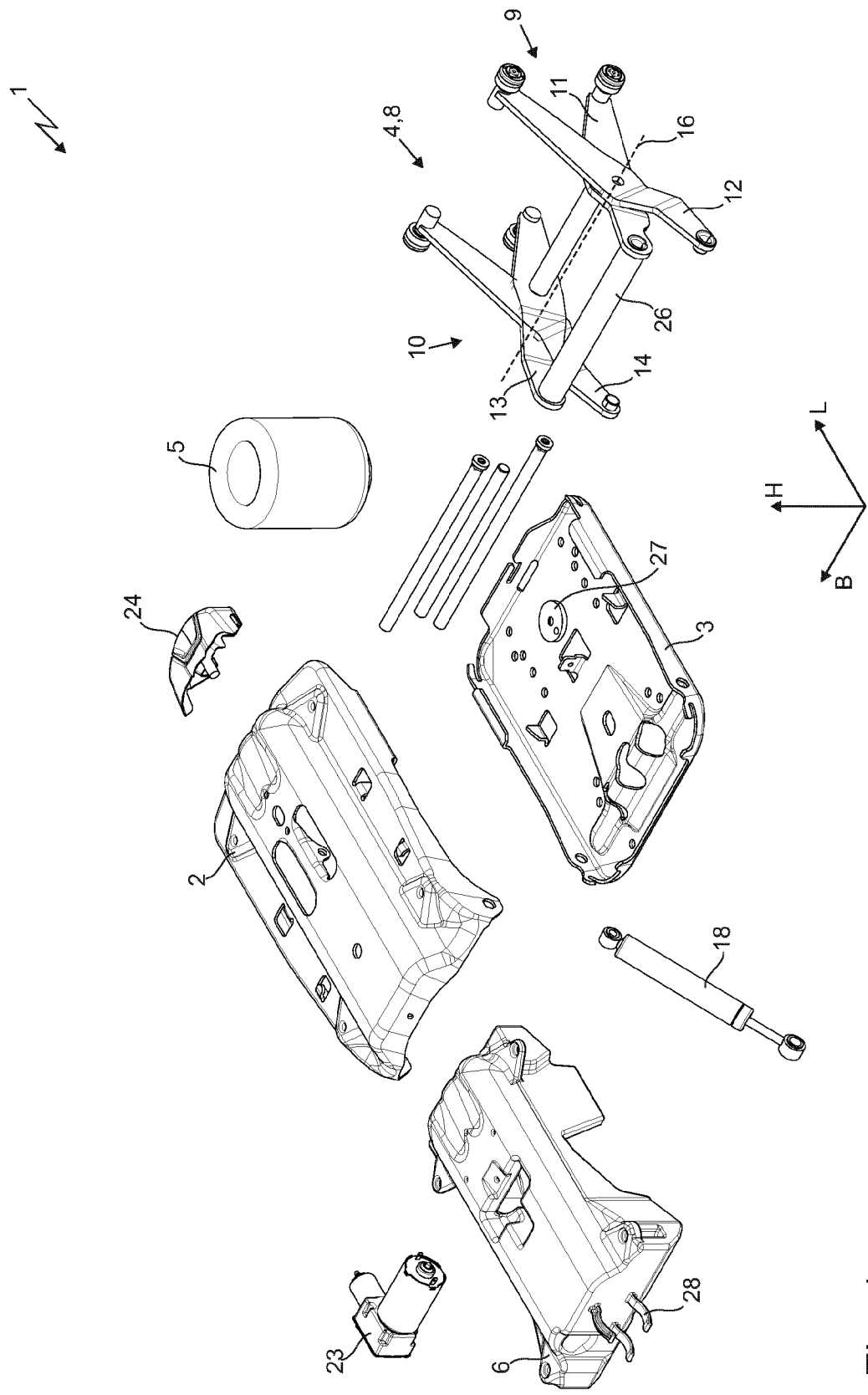
FIG. 1 Elements of a vehicle seat according to a preferred embodiment in a first perspective view.

FIG. 1 shows a vehicle seat 1 in a representation of the individual parts. It can be seen that the vehicle seat 1 comprises a vehicle seat upper part 2, a vehicle seat lower part 3 and a connecting means 4 connecting the vehicle seat upper part 2 and the vehicle seat lower part 3, wherein preferably the connecting means 4 is shown as a scissor frame 8. The scissor frame 8 comprises a first swing arm 9 and a second swing arm 10, the first swing arm 9 comprising a first swing arm part 11 and a second swing arm part 12, the second swing arm 10 also comprising a first swing arm part 13 and a second swing arm part 14. The first swing arm 9 and the second swing arm 10 are spaced apart from each other as seen in the width direction of the vehicle seat 1, wherein a common rotary element 15 is provided which connects the swing arms 9, 10 to each other. For each of the first swing arm 9 and the second swing arm 10, the first swing arm parts 11, 13 and the second swing arm parts 12, 14 are respectively connected to each other rotatably about the first axis of rotation 16, which is formed by the common rotary element 15. Further, it may be provided that a first stabilising element 25 is provided which connects the second rocker parts 12, 14 to each other and that a second stabilising element 26 is provided which connects, for example, the first rocker parts 11, 13 to each other.

Furthermore, the spring element 5 can be seen, which according to this embodiment is connected to the vehicle seat lower part 3 by means of a first spring acceptance 27. On the other hand, the spring element 5 is connected to the additional volume 6, whereby the spring element 5 is arranged between the vehicle seat lower part 3 and a proportion 7 of the additional volume 6. The proportion 7 of additional volume 6 is not shown in FIG. 1. In principle, a proportion 7 of additional volume 6, namely the area which is arranged above spring element 5 as seen in height direction H, can be used for connection to spring element 5.

Furthermore, a first damping element 18 can be seen, which according to this embodiment is connected on the one hand to the connecting means 4 and on the other hand to the vehicle seat upper part 2. When the vehicle seat upper part 2 moves relative to the vehicle seat lower part 3, the first damping element 18 is moved in accordance with the movement of the connecting means 4.

Preferably further connected to the additional volume 6 is a compressor unit 23, which is designed and provided to change a pressure within the additional volume 6 and corresponding to the spring element 5. The compressor unit 23 can be actuated by a corresponding person, whereby air is introduced into the additional volume 6 when it is actuated. Furthermore, an actuator unit 24 is provided, which is connected to the additional volume 6, which can release air from the additional volume 6 when actuated.

Figure 2:
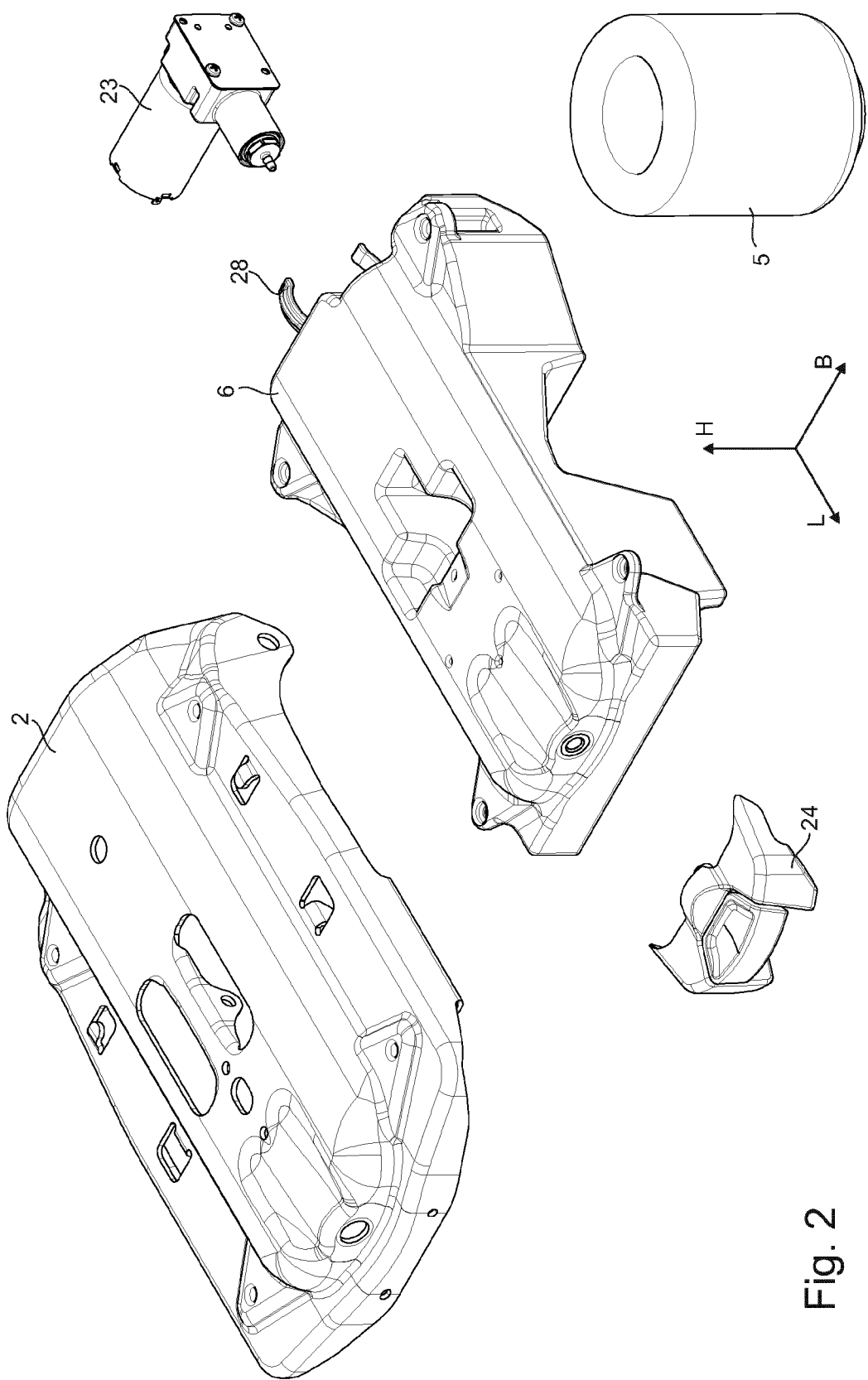
FIG. 2 Elements of the vehicle seat in a second perspective view.

According to FIG. 2, the components relevant for the additional volume 6 are shown again, namely the additional volume 6, the spring element 5, which can preferably be an air spring, the compressor unit 23, the actuator unit 24 and the vehicle seat upper part 2 connected to the additional volume. Furthermore, FIG. 2 is shown in a second perspective view, in contrast to FIG. 1.

Furthermore, the additional volume 6 has an acceptance 28 by means of which the compressor unit 23 can be detachably connected to the additional volume 6.

Figure 3:
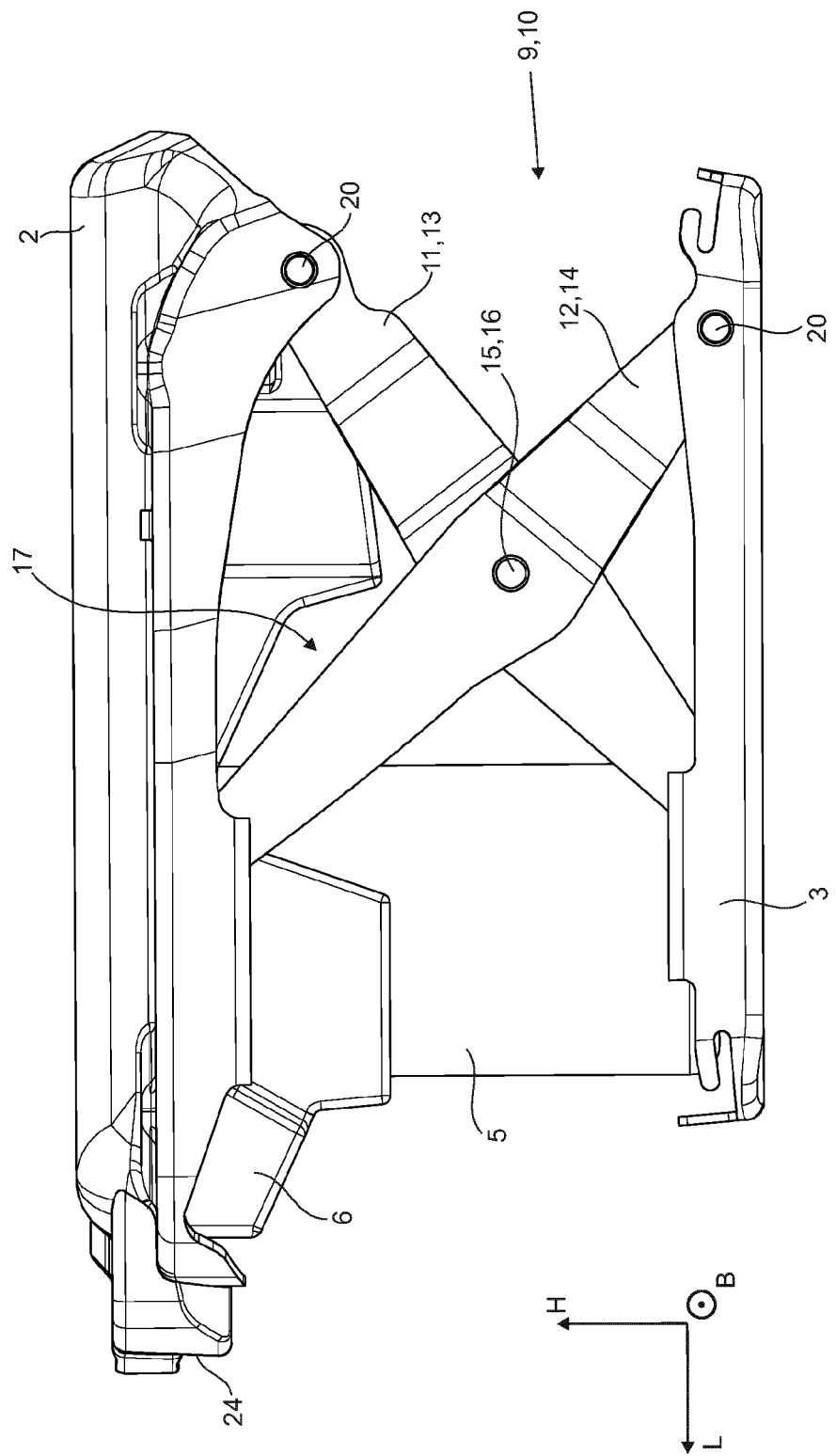
FIG. 3 Side view of the vehicle seat.

FIG. 3 shows the vehicle seat 1 in an assembled state and in a side view. As can be seen, the first swinging part 11, 13 is connected to the vehicle seat upper part 2 by means of a fixed bearing 20, whereby the second swinging part 12, 14 is also connected to the vehicle seat lower part 3 by means of a fixed bearing 20, and whereby the swinging parts 11, 12, 13, 14 are connected to the corresponding vehicle seat upper part 2 or the vehicle seat lower part 3 by means of a floating bearing 21. The floating bearings are not shown here but can be taken from the further figures.

The design of the scissor frame by means of the fixed bearings 20 and the floating bearings 21 defines a guidance of the vehicle seat upper part 2 with respect to the vehicle seat lower part 3, so that a movement of the rocker arms 9, 10 with respect to each other is fixed and thereby correspondingly also the movement of the common rotary element 15. If the vehicle seat upper part 2 and the vehicle seat lower part 3 move towards each other as seen in the height direction, the distance between the vehicle seat upper part 2 and the vehicle seat lower part 3 decreases accordingly, so that a first recess 17 of the additional volume 6 must be provided, so that damage to the additional volume 6 can be avoided by the common rotary element 15 striking against the additional volume 6. This is done in accordance with a correspondingly designed first recess 17 of the additional volume 6. In order to be able to accommodate the common rotary element 15 well, the recess is arranged in particular extending in width direction B.

During a relative movement of the vehicle seat upper part 2 towards the vehicle seat lower part 3, the movement of the common rotary element 15 is forward as seen in longitudinal direction L and downward as seen in height direction H. On a relative movement of the vehicle seat upper part 2 away from the vehicle seat lower part 3, the movement of the common rotary element 15 is rearward as seen in longitudinal direction L and upward as seen in height direction H. This means that the first recess 17 in the illustration of FIG. 3 is displaced with respect to the common rotary element 15 in the spatial directions of longitudinal direction L and height direction H. The first recess 17 is arranged accordingly so that the common rotary element 15 can be received in the first recess 17 during a relative movement of the vehicle seat upper part 2 towards the vehicle seat lower part 3.

Figure 4A:
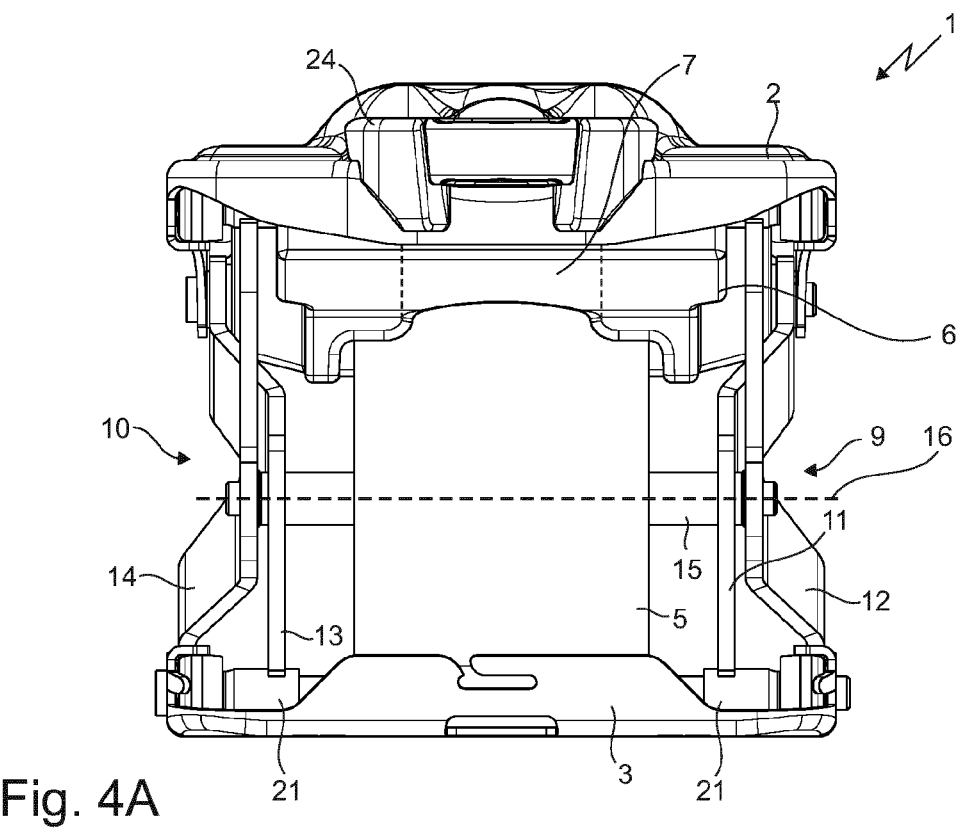
FIG. 4A Front view of the vehicle seat.
Figure 4B:
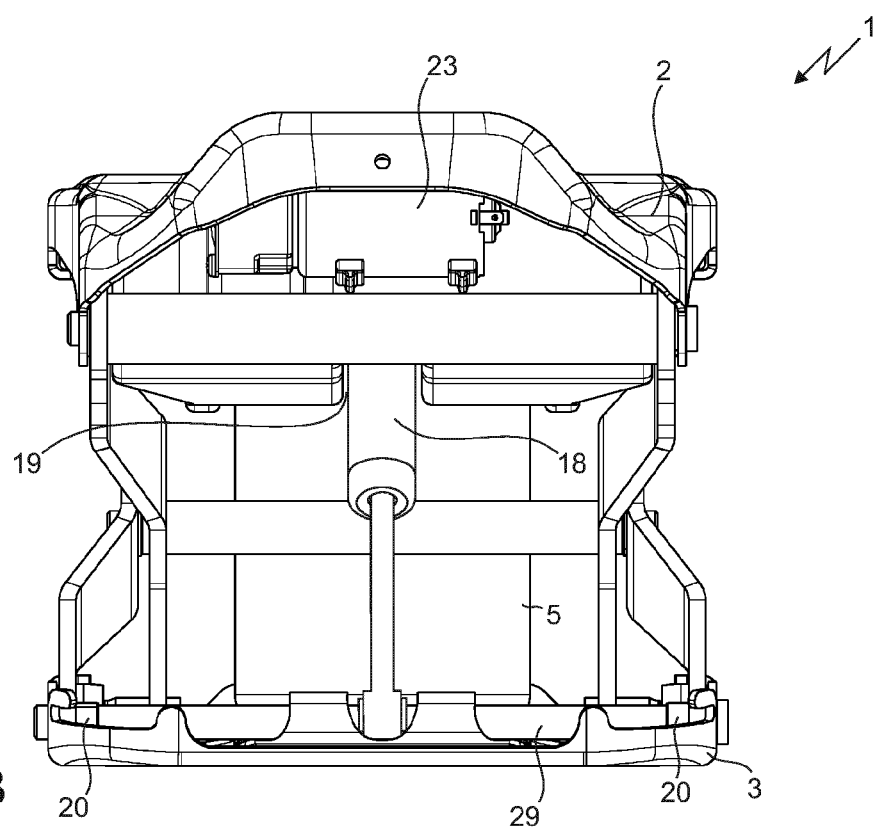
FIG. 4B Rear view of the vehicle seat.

FIG. 4A shows the vehicle seat 1 in a front view, whereas FIG. 4B shows the vehicle seat 1 in a rear view.

It can be seen particularly well here that the additional volume 6 is at least partially arranged between the rockers 9, 10, whereby in particular the additional volume 6 does not extend further in the two spatial directions L, B than the vehicle seat upper part 2 or the vehicle seat lower part 3.

Furthermore, the proportion 7 of the additional volume 6 which is arranged between the vehicle seat upper part 2 and the spring element 5 can also be seen. It can also be seen that the first rocker parts 11, 13 and the second rocker parts 12, 14 each have a floating bearing 21, the floating bearings 21 being arranged so as to be displaceable relative to the vehicle seat upper part 3 and the vehicle seat lower part 2 respectively.

FIG. 4B now also shows the second recess 19, which is designed and intended to receive a first damping element 18, in particular in the event of a relative movement of the vehicle seat upper part 2 with respect to the vehicle seat lower part 3. It should be noted that the second recess 19 is restricted as seen in the three spatial directions L, B, H, i.e. the additional volume 6 surrounds the second recess 19 in each case.

It can further be seen that the first swing arm parts 11, 13 and the second swing arm parts 12, 14 each comprise a fixed bearing 20, the fixed bearings 20 of the second swing arm parts 12, 14 and the first swing arm parts 11, 13 respectively being connected to a connecting tube 29, so that the first damping element 18 is connected to the connecting tube 29 between the fixed bearings 20 of the second swing arm parts 12, 14. Furthermore, the first damping element 18 is presently connected to the vehicle seat upper part 2. It is also conceivable that the first damping element 18 is connected to the connecting tube 29 between the fixed bearings 20 of the first rocker parts 11, 13 and to the vehicle seat lower part 3. During a relative movement of the vehicle seat upper part 2 to the vehicle seat lower part 3, a damping force of the movement of the vehicle seat upper part 2 to the vehicle seat lower part 3 is therefore introduced accordingly.

Figure 5A:
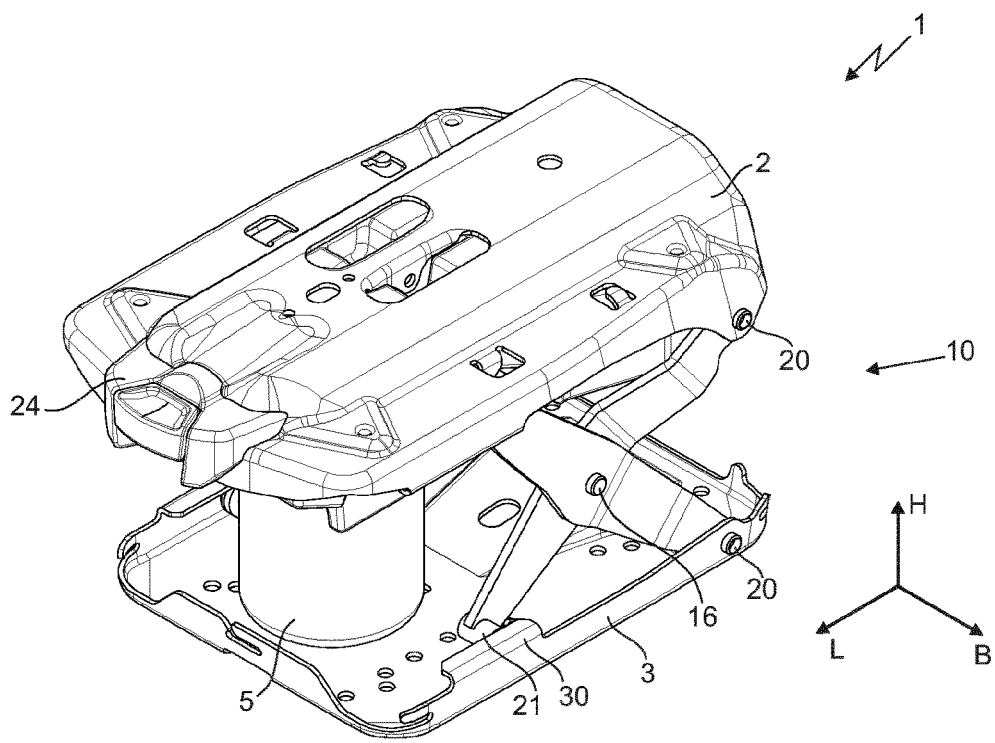
FIG. 5A perspective view of the assembled vehicle seat.
Figure 5B:
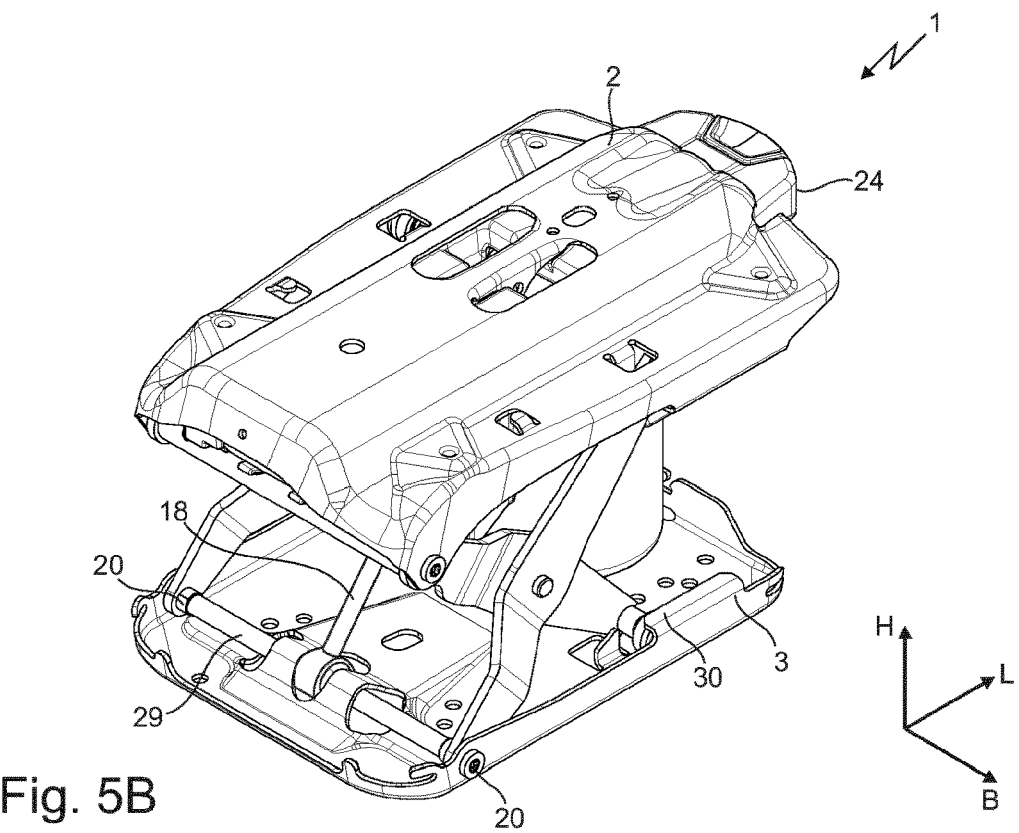
FIG. 5B further perspective view of the assembled vehicle seat.

FIGS. 5A and 5B show an assembled vehicle seat 1 in a front view and a rear view respectively, whereby the components have already been described. Only further to the floating bearings 21 are floating bearing guides 30 provided, which are integral with the vehicle seat lower part 3 and which are provided and designed to guide the floating bearings 21 relative to the vehicle seat lower part 3 in longitudinal direction L.

FIG. 6A shows the additional volume 6 with the spring element 5, whereby the first recess 17 and a third recess 31 are shown. The first recess 17 has already been explained, whereas the third recess 31 is explained in connection with FIG. 6C.

Furthermore, fixing points 32 are visible, by means of which the additional volume 6 can be connected to the vehicle seat upper part 2 or the vehicle seat lower part 3, for example by means of a screw connection. Furthermore, an upper side 22' or a lower side 22" can be seen which, depending on the design, is complementary or at least partially complementary with the vehicle seat upper part 2 or the vehicle seat lower part 3.

Figure 6B:
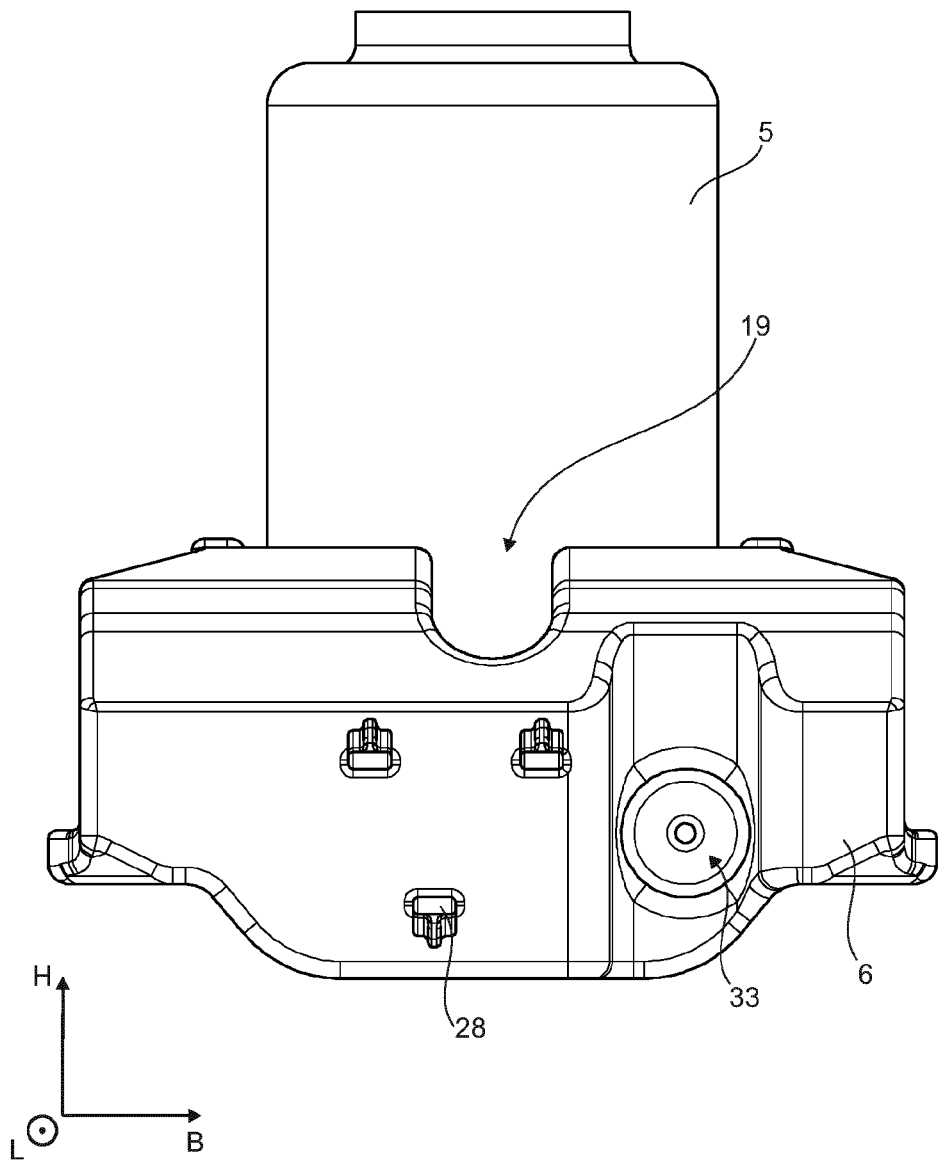
FIG. 6B rear view of the additional volume and spring unit.

FIG. 6B shows the object of FIG. 6A in a rear view, whereby the acceptance 28 for the compressor unit 23 (not shown here) is shown as well as a connection 33 of the compressor unit 23 with the additional volume 6. The connection 33 of the additional volume 6 with the compressor unit 23 is such that the compressor unit 23 can be brought at least partially into the additional volume 6, since the connection 33 is formed as an acceptance. This connection 33 can also do without a hose element or other connecting elements, so that the compressor unit 23 is directly connected to the additional volume 6.

Furthermore, the second recess 19 can be seen in FIG. 6B, which extends in particular in the longitudinal direction L and in the height direction H. In the width direction B, a small extension of the recess 19 is provided compared to the other extensions, whereby the extension in the width direction B is such that the first damping element 18 can be accommodated therein.

Figure 6C:
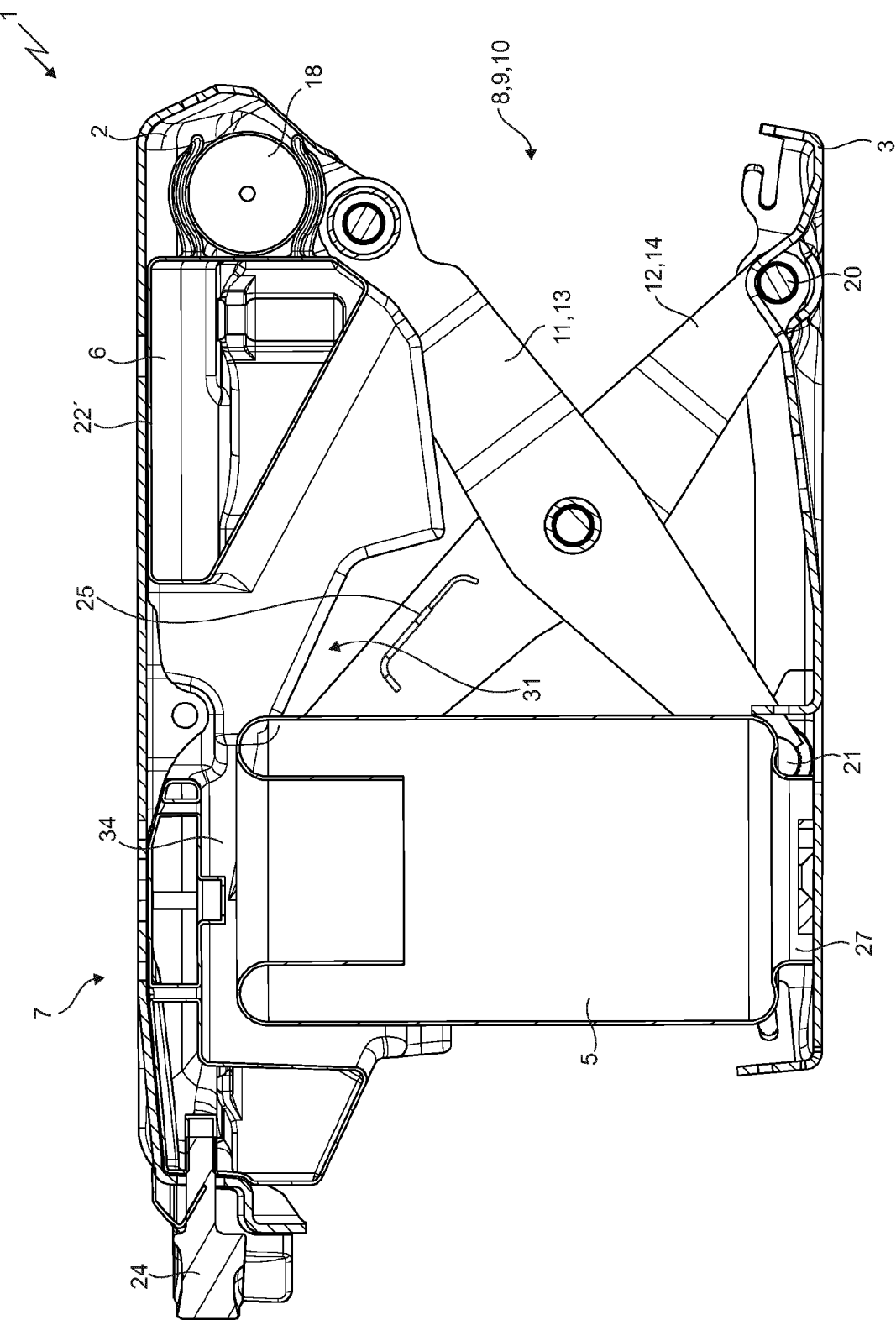
FIG. 6C Sectional view of the vehicle seat.

FIG. 6C shows a sectional view of the vehicle seat 1 as shown in FIG. 3, whereby the third recess 31 can be discussed further.

FIG. 6C shows the third recess 31, which is designed in particular to receive the first stabilising element 25 between the swing arms 9, 10, so that damage to the additional volume 6 can also be avoided here. Furthermore, the proportion 7 of additional volume 6 is shown again, whereby the proportion 7 of additional volume 6 is arranged between the spring element 5 and the vehicle seat upper part 2 as seen in height direction H. The spring element 5 is connected to the additional volume 6 by means of a second spring acceptance 34.

All features disclosed in the application documents are claimed to be essential to the invention insofar as they are new, individually or in combination, compared to the prior art.

REFERENCE LIST

1 Vehicle seat
2 Vehicle seat upper part
3 Vehicle seat lower part
4 Connecting means
5 Spring element
6 Additional volume
7 Proportion of additional volume
8 scissor frame
9 first swing arm
10 second swing arm
11 first swing arm part of the first swing arm
12 second swing arm part of the first swing arm
13 first swing arm part of the second swing arm
14 second swing arm part of the second swing arm
15 common rotary element
16 first axis of rotation
17 first recess
18 first damping element
19 second recess
20 fixed bearing
21 floating bearing
22 side
22' upper side
22" lower side
23 Compressor unit
24 actuator unit
25 first stabilising element
26 second stabilising element
27 first spring acceptance
28 acceptance
29 connecting tube
30 floating bearing guide
31 third recess
32 Mounting point
33 connection
34 Second spring acceptance
L longitudinal direction
B width direction
H Height direction

What is claimed is:
1. A vehicle seat, comprising:
a vehicle seat upper part; and a vehicle seat lower part, the vehicle seat upper part and the vehicle seat lower part being connected to one another by means of a connecting means in such a way that the vehicle seat upper part can be moved relative to the vehicle seat lower part and, in the event of a relative movement of the vehicle seat upper part with respect to the vehicle seat lower part, the relative movement can be sprung by means of a spring element, wherein the vehicle seat has an additional volume, the spring element being arranged between the vehicle seat upper part or the vehicle seat lower part and a proportion of the additional volume, wherein the connecting means is a scissor frame having a first swing arm and a second swing arm, the first swing arm and the second swing arm each having a first and a second swing arm part, and the first swing arm and the second swing arm being connected by means of a common rotary element which forms a first axis of rotation, and the additional volume being arranged at least partially between the first swing arm and the second swing arm, as viewed in a width direction of the vehicle seat, and wherein the additional volume has a first recess extending in the width direction, such that the common rotary element can be received by the first recess during a relative movement of the vehicle seat upper part with respect to the vehicle seat lower part.

2. The vehicle seat according to claim 1, wherein a first damping element is provided, which is connected to the vehicle seat upper part or the vehicle seat lower part and to the connecting means, the additional volume having a second recess extending in a height direction and a longitudinal direction of the vehicle seat, such that, in the event of a relative movement of the vehicle seat upper part with respect to the vehicle seat lower part, the first damping element can be received by the second recess.

3. The vehicle seat according to claim 1, wherein the first swing arm part is rotatably connected to the vehicle seat upper part by means of a fixed bearing and to the vehicle seat lower part by means of a floating bearing, the second swing arm part being rotatably connected to the vehicle seat lower part by means of a fixed bearing and to the vehicle seat upper part by means of a floating bearing.

4. The vehicle seat according to claim 1, wherein the spring element is fluidically connected directly to the additional volume such that the connection between the spring element and the additional volume is free of further connection elements.

5. The vehicle seat according to claim 1, wherein one side of the additional volume is formed complementary to the vehicle seat upper part or the vehicle seat lower part.

6. The vehicle seat according to claim 1, wherein a compressor unit is provided which is fluidically connected to the additional volume in order to change a pressure in the additional volume as required.

7. The vehicle seat according to claim 1, wherein the additional volume is dimensionally stable and is formed from a plastic.

8. A vehicle seat, comprising:
a vehicle seat upper part; and
a vehicle seat lower part, the vehicle seat upper part and the vehicle seat lower part being connected to one another by means of a connecting means in such a way that the vehicle seat upper part can be moved relative to the vehicle seat lower part and, in the event of a relative movement of the vehicle seat upper part with respect to the vehicle seat lower part, the relative movement can be sprung by means of a spring element, wherein the vehicle seat has an additional volume, the spring element being arranged between the vehicle seat upper part or the vehicle seat lower part and a proportion of the additional volume, and wherein a first damping element is provided, which is connected to the vehicle seat upper part or the vehicle seat lower part and to the connecting means, the additional volume having a second recess extending in a height direction and a longitudinal direction of the vehicle seat, such that, in the event of a relative movement of the vehicle seat upper part with respect to the vehicle seat lower part, the first damping element can be received by the second recess.

9. The vehicle seat according to claim 8, wherein the connecting means is a scissor frame having a first swing arm and a second swing arm, the first swing arm and the second swing arm each having a first and a second swing arm part, and the first swing arm and the second swing arm being connected by means of a common rotary element which forms a first axis of rotation, and the additional volume being arranged at least partially between the first swing arm and the second swing arm, as viewed in a width direction of the vehicle seat.

10. The vehicle seat according to claim 9, wherein the first swing arm part is rotatably connected to the vehicle seat upper part by means of a fixed bearing and to the vehicle seat lower part by means of a floating bearing, the second swing arm part being rotatably connected to the vehicle seat lower part by means of a fixed bearing and to the vehicle seat upper part by means of a floating bearing.

11. The vehicle seat according to claim 8, wherein
the spring element is fluidically connected directly to the additional volume such that the connection between the spring element and the additional volume is free of further connection elements.

12. The vehicle seat according to claim 8, wherein
one side of the additional volume is formed complementary to the vehicle seat upper part or the vehicle seat lower part.

13. The vehicle seat according to claim 8, wherein
a compressor unit is provided which is fluidically connected to the additional volume in order to change a pressure in the additional volume as required.

14. The vehicle seat according to claim 8, wherein
the additional volume is dimensionally stable and is formed from a plastic.

* * * * *